Dec. 12, 1967 V. H. MEYER 3,357,646
COMBINATION OILING AND LAYBY SPRAY BOOM
Filed March 31, 1966
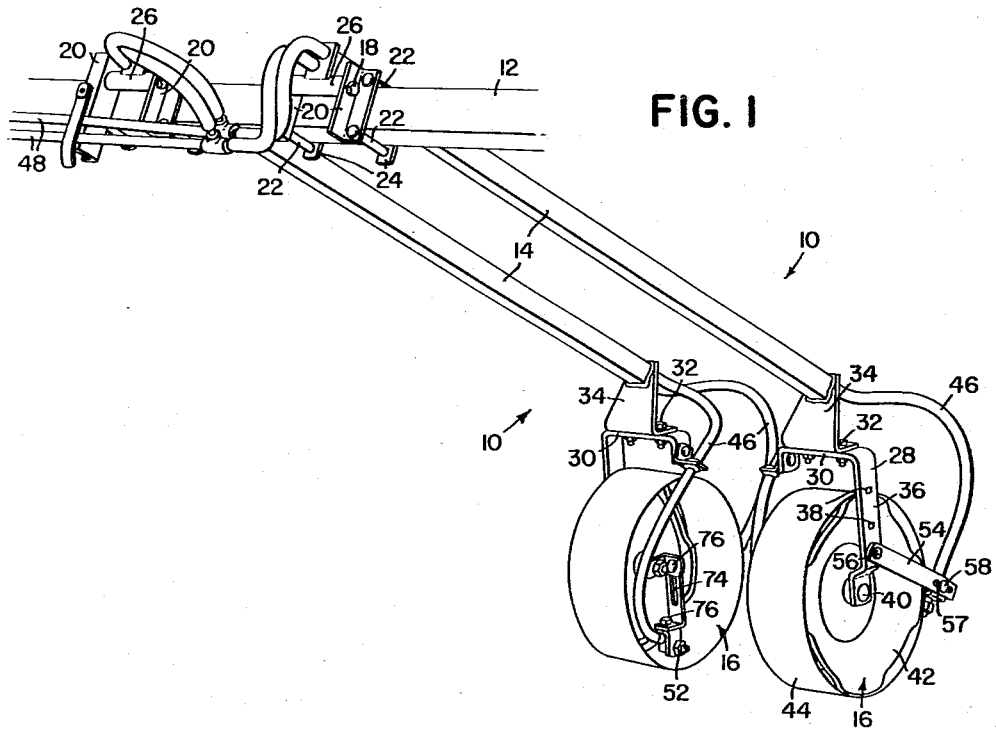
INVENTOR.
VERNIS H. MEYER
BY

United States Patent Office 3,357,646
Patented Dec. 12, 1967

3,357,646
COMBINATION OILING AND LAYBY
SPRAY BOOM
Vernis Henry Meyer, Granger, Iowa, assignor to Deere &
Company, Moline, Ill., a corporation of Delaware
Filed Mar. 31, 1966, Ser. No. 539,198
4 Claims. (Cl. 239—288.5)

This invention relates generally to agricultural machinery and more particularly to an apparatus for spraying row crops.

In the spraying of row crops, such as cotton, it is the practice to spray in different manners as the crop matures. Thus in cotton it is the practice to spray herbicides in the row shortly after the plants emerge, and later when the plants are more mature to spray the middle between the rows, the first form of spraying being called oiling, and the second form of spraying being known as layby.

When oiling row crops it is the practice to apply sprays from opposite sides of the row, a portion of each spray being directed through a nozzle towards the row. The height of the spray material must be closely regulated since it should be high enough to insure that the entire row area is treated with herbicide material but low enough so that no spray material contacts the leaves or buds of the young cotton plants. (The herbicide material may contact the waxy stem of the plant without doing damage to it.) Since the placement of the spray material is critical when oiling it has been the practice to employ pairs of spray rigs, one pair for each row, mounted on the front of a tractor, each individual rig being individually gauged to maintain the proper height of spray material. Spraying is done at slow speeds and on days when little wind is present to prevent the spray from drifting onto the leaves of the plant. It is frequently necessary when oiling to stop and adjust the nozzles since any obstructions they encounter when passing down the rows is likely to knock them out of their critical adjustment.

In layby application it is the practice to mount the spray nozzles on rigs to the rear of a tractor and to spray the middles between the rows. The placement of spray material in a layby application is not as critical since the material is not sprayed closely adjacent to the plant and therefore higher speeds can be employed than in the customary oiling operation.

It has generally been the practice to employ separate equipment for oiling and layby, although recently universal spray applicators have been introduced. However, none of these have been entirely satisfactory for a variety of reasons.

It is an object of this invention to provide a spray applicator which is suitable for both oiling and layby. It is a further object of this invention to provide a spray applicator suitable for oiling in which the applicator may be propelled forwardly at relatively high speeds without drifting of the spray material. A still further object of this invention is to provide a spray applicator having shielding means to protect the spray nozzles from encountering foreign objects in their path thereby maintaining proper adjustment, the shielding means also acting as a windshield.

Another object of this invention is the provision of a spray applicator which may be used for oiling and layby which is reliable in operation, substantially maintenance free, and relatively low in cost.

These and other objects and advantages of this invention will be apparent to those skilled in the art after a consideration of the following detailed description, taken in conjunction with the accompanying drawings in which the preferred form of this invention is illustrated.

FIG. 1 is a perspective view of a pair of spray applicator rigs mounted for oiling.

FIG. 2 is an enlarged perspective view of a portion of one of the spray applicator rigs shown in FIG. 1.

Each spray applicator rig, which is indicated generally at 10, is carried by a transversely extending toolbar 12 which is carried by either the front or the rear of a tractor depending upon whether oiling or layby is being done. Each spray applicator rig includes a generally longitudinally extending frame member 14 which is secured to the toolbar 12 at its upper forward end, the lower rearward end of the frame member being supported upon the ground by a gauge wheel, indicated generally at 16. The frame member 14 is secured to the toolbar for vertical swinging by means of a pivot bolt 18 which is carried by a pair of clamping members, each of which includes an angle member 20 which is suitably apertured to receive on one side the pivot bolt 18 and to receive also bolts 22 which secure the angle member to a backing plate 24. The upper end of the frame member 14 carries a sleeve 26 which is disposed about the pivot bolt 18.

The gauge wheel assembly 16 includes a support member 28 having a transversely extending portion 30 which is suitably apertured and adapted to be adjustably secured by means of fasteners 32 to a generally triangularly-shaped member 34 which is welded or otherwise secured to the lower rear end of the frame member 14, member 34 having a generally horizontal flange portion 35 which receives the fasteners 32. The support member 28 has a vertically disposed portion 36 which is suitably apertured as at 38 for reasons to be set forth below, the lower end of the vertically disposed portion carrying axle means 40. A disk 42 is rotatably disposed about the transversely extending axle means and carries on its radially outer edge an axially extending cylinder 44 secured at one end to the disk.

The frame member 14 is tubular and carries within it hoses 46, the upper end of the hoses being connected to conduits 48 through which spray material may pass from a tank on the tractor to spray nozzles 50, 52. Each of the spray nozzles 50 is mounted to the rear of the gauge wheel by means of a strap 54 which is secured to the vertical portion 36 of the support member 28 by means of a fastener 56 that passes through one of the apertures 38. The rear end of the strap 54 is provided with an elongated aperture 57 through which a fastener 58 passes securing an L-shaped member 60 to the rear end of the strap 54. The L-shaped member is also provided with an elongated aperture 62 through which another fastener is passed securing another L-shaped member 64, this member being apertured to receive the nozzle 50 which is conventionally secured thereto.

The nozzle 52 is disposed substantially within the cylindrical member 44 and is secured to the axle by means of a bolt 66 and L-shaped members 68, 70 and 72 which are provided with elongated slots 74 and which are interconnected by means of fasteners 76, the nozzle passing through an aperture in the L-shaped member 72 and being secured thereto in a conventional manner. The hose 46 that supplies the nozzle 52 is passed through a rubber grommet 78 carried by an L-shaped strap 80 at one end of the transverse portion 30 of the support member 28, the L-shaped member also being secured thereto in a conventional fashion.

In operation, when oiling, a pair of spray applicator rigs are disposed in the manner illustrated in FIG. 1 with the row of plants passing between the gauge wheel assembly 16. Spray is directed towards the row through nozzle 52 and the proper height relationship of this nozzle to the ground is gauged by the cylindrical member 44 and disk 42. The cylindrical member 44 acts as a windshield and prevents the spray material from drifting onto the leaves and buds of the plant thereby permitting a faster speed, and also serves to prevent the adjustable members 68, 70, 72 from contacting foreign objects which may lie within their path. When used for layby, only one rig 10 is applied for each middle, the layby material being discharged through the nozzle 50.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. An apparatus adapted to be secured to a propelling device for forward movement over a field for spraying plants adjacent the ground including: support means mounted for vertical movement relative to the ground, said support means including axle means disposed parallel to the ground, ground-engaging means rotatably carried by said axle means, said ground-engaging means including radially outwardly extending means journaled for rotation about said axle, axially extending imperforate annular means carried by an outer portion of said radially outwardly extending means, nozzle means through which spray material is discharged, and means interconnecting said nozzle with said support means and disposing said nozzle within said annular means whereby when said apparatus is propelled forwardly over the ground the ground-engaging means maintains the nozzle a substantially fixed distance above the ground, protects the nozzle from any objects disposed within its path, and acts as a windshield for the spray material emerging from said nozzle.

2. The apparatus set forth in claim 1 in which said support means includes a toolbar adapted to be secured transversely to the propelling device, and an elongated member pivotally secured at its upper forward end to said toolbar.

3. The apparatus set forth in claim 1 in which said means interconnecting comprises adjustable bracket means secured at one end to said axle means, the nozzle means being mounted on the other end.

4. The apparatus set forth in claim 3 in which said adjustable bracket means comprises a plurality of L-shaped brackets having an aperture on each leg, at least one of said apertures being elongated, and fastener means passing through said apertures to hold said brackets in various positions of adjustment.

References Cited

UNITED STATES PATENTS

| 2,580,145 | 12/1951 | White | 239—172 |
| 3,147,568 | 9/1964 | Inhofer | 47—1.7 |
| 3,294,324 | 12/1966 | Slaptason | 239—288 |

M. HENSON WOOD, JR., *Primary Examiner.*

H. NATTER, *Assistant Examiner.*